(12) United States Patent
Craig et al.

(10) Patent No.: US 7,132,087 B2
(45) Date of Patent: Nov. 7, 2006

(54) CATALYTIC CONVERTER ASSEMBLY

(75) Inventors: Mark W. Craig, Mossville, IL (US); Stephan D. Roozenboom, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 917 days.

(21) Appl. No.: 10/020,825

(22) Filed: Dec. 13, 2001

(65) Prior Publication Data

US 2003/0113241 A1   Jun. 19, 2003

(51) Int. Cl.
*F01N 3/08* (2006.01)
*F01N 3/10* (2006.01)

(52) U.S. Cl. .......................... 422/176; 60/299; 60/302

(58) Field of Classification Search ................ 422/176, 422/177, 180; 60/324
See application file for complete search history.

(56) References Cited

U.S. PATENT DOCUMENTS

| | | | |
|---|---|---|---|
| 3,964,875 A * | 6/1976 | Chang et al. ................ | 422/176 |
| 3,968,645 A | 7/1976 | Noguchi et al. | |
| 4,005,576 A | 2/1977 | Nohira et al. | |
| 4,151,717 A | 5/1979 | Katsumoto et al. | |
| 4,182,120 A * | 1/1980 | Niebylski ................... | 422/176 |
| 4,395,876 A | 8/1983 | Marsee et al. | |
| 4,559,776 A | 12/1985 | Arai et al. | |
| 5,031,401 A | 7/1991 | Hinderks | |
| 5,293,743 A | 3/1994 | Usleman et al. | |
| 5,388,407 A | 2/1995 | Capers et al. | |
| 5,410,877 A | 5/1995 | Shimada et al. | |
| 5,438,828 A | 8/1995 | Fukae | |
| 5,674,461 A | 10/1997 | Kato et al. | |
| 5,845,748 A | 12/1998 | Schaefer et al. | |
| 6,009,706 A | 1/2000 | Haneda | |
| 6,082,103 A | 7/2000 | Sugiura et al. | |

\* cited by examiner

*Primary Examiner*—Glenn Caldarola
*Assistant Examiner*—Tom P. Duong
(74) *Attorney, Agent, or Firm*—Byron G. Buck; Finnegan, Henderson, Farabow, Garrett & Dunner

(57) ABSTRACT

An embodiment includes an apparatus and method of distributing gases within a catalytic converter assembly. Gases flow through at least one inlet into a housing and out of the housing through at least one outlet. A substrate is disposed at least partially between at least one of the at least one inlet and at least one of the at least one outlet. The mass flow rate of the gases across at least one surface of a deflector are substantially equalized as the gases flow through at least one of the at least one inlet into the housing and out of the housing through at least one of the at least one outlet.

19 Claims, 4 Drawing Sheets

Fig_2_

CATALYTIC CONVERTER ASSEMBLY

TECHNICAL FIELD

The present invention relates to a catalytic converter assembly, and more particularly, to a deflector and a method of distributing gases within a catalytic converter assembly.

BACKGROUND

Aftertreatment devices like catalytic converter assemblies are widely known and available for use with diesel engines. Often, a unique catalytic converter assembly may be required for use with each original equipment manufacturer because each original equipment manufacturer utilizes a unique chassis. These assemblies include aftertreatment devices such as that disclosed in U.S. Pat. No. 5,031,401 to Hinderks.

Many assemblies have a housing and a catalyst coated substrate retained inside of the housing. The housing typically includes an inlet for permitting exhaust gases to enter the housing wherein they pass through the substrate and exit out through an outlet. The housing typically protects the catalyst coated substrate and directs exhaust gases to flow through the catalyst coated substrate. The catalyst's purpose is to catalyze chemical reactions with exhaust gases in order to reduce emissions content. The catalyst materials are typically coated on a flow-through honeycomb-type substrate. The substrate provides an opportunity for exhaust gases to interact with the catalyst and may be of any of a number of known materials such as a cordierite ceramic material or a metal foil material. However, it should be appreciated that the specific choice of materials and type of substrate is determined by the specific emissions performance desired and is dependent upon the particular engine used in combination with the catalyst.

As exhaust gases flow past a catalyst coated substrate a phenomenon known as plugging may occur. Plugging is when certain portions of the exhaust gases accumulate on the catalyst. Over time, the accumulation can continue to build up to the extent that flow of exhaust gases across portions of a catalytic coated substrate may be precluded. Therefore, it may be desirable to fairly evenly distribute the flow of exhaust gases across the catalyst coated substrate.

Additionally, it is desirable to pass as hot of exhaust gases as possible across catalyst coated substrates in order to utilize the additional heat during the catalytic reduction process. Hotter exhaust gases are also less likely to cause as much plugging as cooler exhaust gases. Therefore, it may be beneficial to mount the catalytic converter assembly directly to the exhaust manifold of an engine, thereby reducing heat lost by exhaust gases prior to flowing across the catalyst coated substrate. Mounting the catalytic converter assembly directly to the exhaust manifold also facilitates using the same converter assembly for many different original equipment manufacturers.

However, known assemblies fail to bring exhaust gases into a housing, turn the exhaust gases quickly, balance flow variances and evenly distribute flow of exhaust gases across the catalyst coated substrate in a manner which achieves optimal emissions reduction. Prior systems use complex control systems or rely on precise port sizing and geometric relationships to achieve distribution of the exhaust gases across the catalyst coated substrate. When used over engines with multiple ratings and having multiple operating conditions the many various components, intricacies of the structural members, and complexity of the exhaust gas flows may increase manufacturing and design costs as well as increase maintenance and other owning and operating costs.

SUMMARY OF THE INVENTION

In an embodiment, a catalytic converter assembly includes a substrate, a housing and at least one deflector. The housing has at least one inlet port and at least one outlet port. The at least one inlet and the at least one outlet being in fluid communication such that gases flow through the at least one inlet into the housing and out of the housing through the at least one outlet. The housing is adapted to receive the substrate. The substrate is at least partially disposed between at least one of the at least one inlet and at least one of the at least one outlet. The at least one deflector has at least one surface. The at least one deflector being movably connected to the housing at a location generally between at least one of the at least one inlet and the substrate. The at least one deflector is configured to substantially equalize the mass flow rate of the gases across the at least one surface as the gases flow through the at least one inlet into the housing and out of the housing through the at least one outlet.

In an embodiment, a method of distributing gases within a catalytic converter assembly includes the steps of flowing gases, disposing a substrate and substantially equalizing the mass flow rate. Gases flow through at least one inlet into a housing and out of the housing through at least one outlet. The substrate is disposed at least partially between at least one of the at least one inlet and at least one of the at least one outlet. The mass flow rate of the gases is substantially equalized across at least one surface of a deflector as the gases flow through at least one of the at least one inlet into the housing and out of the housing through at least one of the at least one outlet.

In an embodiment, a catalytic converter assembly includes a substrate, a housing, at least one deflector and at least one protrusion. The housing having at least one inlet port and at least one outlet port. The at least one inlet and the at least one outlet being in fluid communication such that gases flow through the at least one inlet into the housing and out of the housing through the at least one outlet. The housing being adapted to receive the substrate. The substrate at least partially disposed between at least one of the at least one inlet and the at least one of the at least one outlet. The at least one deflector having at least one surface. The at least one protrusion at least one of extending from, attached to and formed integral with at least one of the at least one surface. The at least one deflector being movably connected to the housing at a location generally between the substrate and at least one of the at least one inlet such that the gases flow across the at least one surface as the gases flow through the at least one inlet into the housing and out of the housing through the at least one outlet.

In an embodiment, a deflector for use in a catalytic converter assembly includes a generally polyhedron portion and at least one protrusion. The generally polyhedron portion having a leading surface and a trailing surface separating a top surface and a bottom surface. The at least one protrusion at least one of extending from and formed integral with at least one of the top surface and the bottom surface.

DETAILED DESCRIPTION

Figure 1:
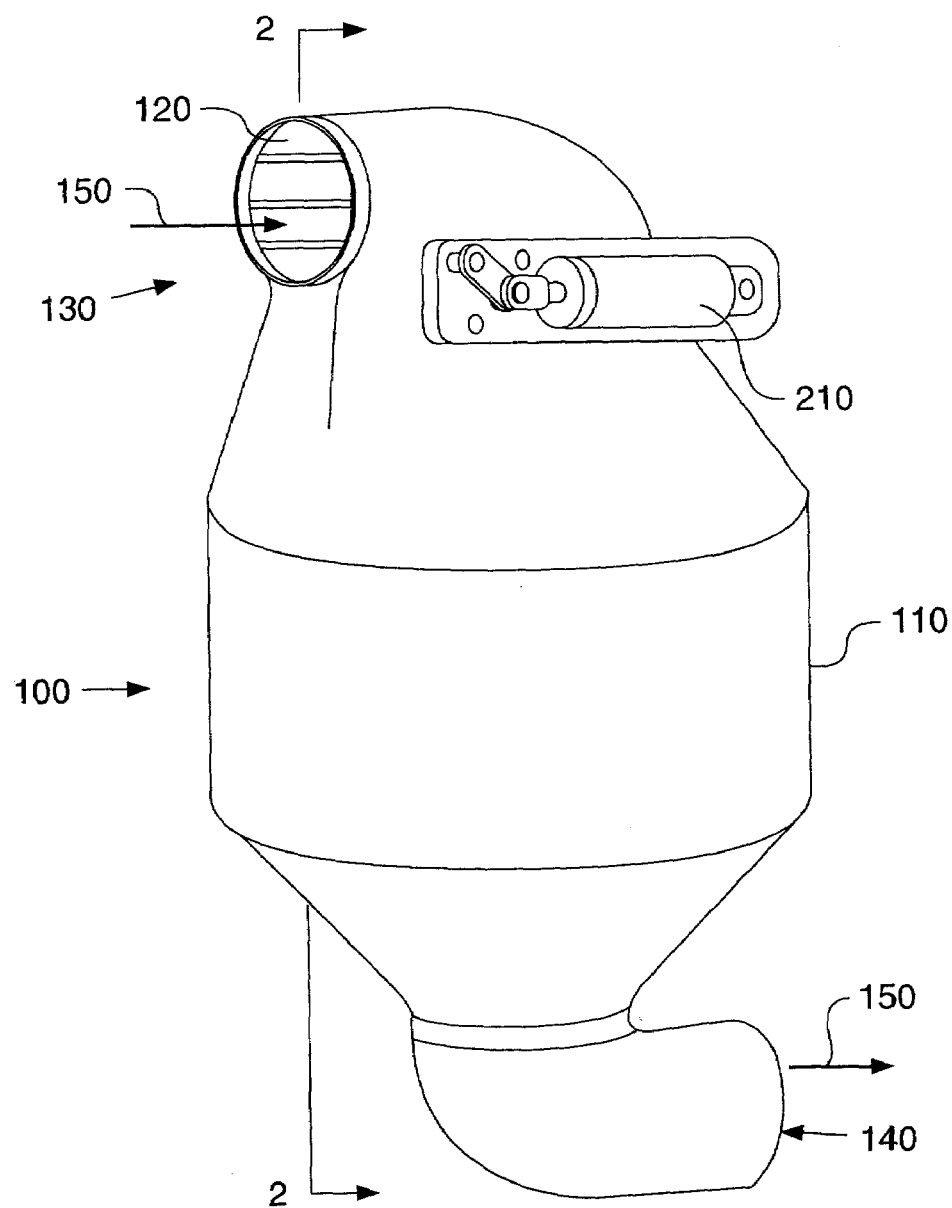
FIG. 1 is a perspective view of an embodiment.

Referring to FIG. 1, a catalytic converter assembly 100 including a substrate 200 (FIG. 2), a housing 110 and at least one deflector 120 is disclosed.

Housing 110 has at least one inlet port 130 and at least one outlet port 140. The at least one inlet port 130 and the at least one outlet port 140 are arranged in fluid communication such that gases 150 are permitted to flow through the at least one inlet port 130 into the housing 110 and out of the housing 110 through the at least one outlet port 140. It should be appreciated that any number of inlet ports 130 and outlet ports 140 may be utilized in combination to permit gases 150 to flow into and out of housing 110. Such alternative embodiments are within the scope of the present invention as claimed in the appended claims.

Figure 2:
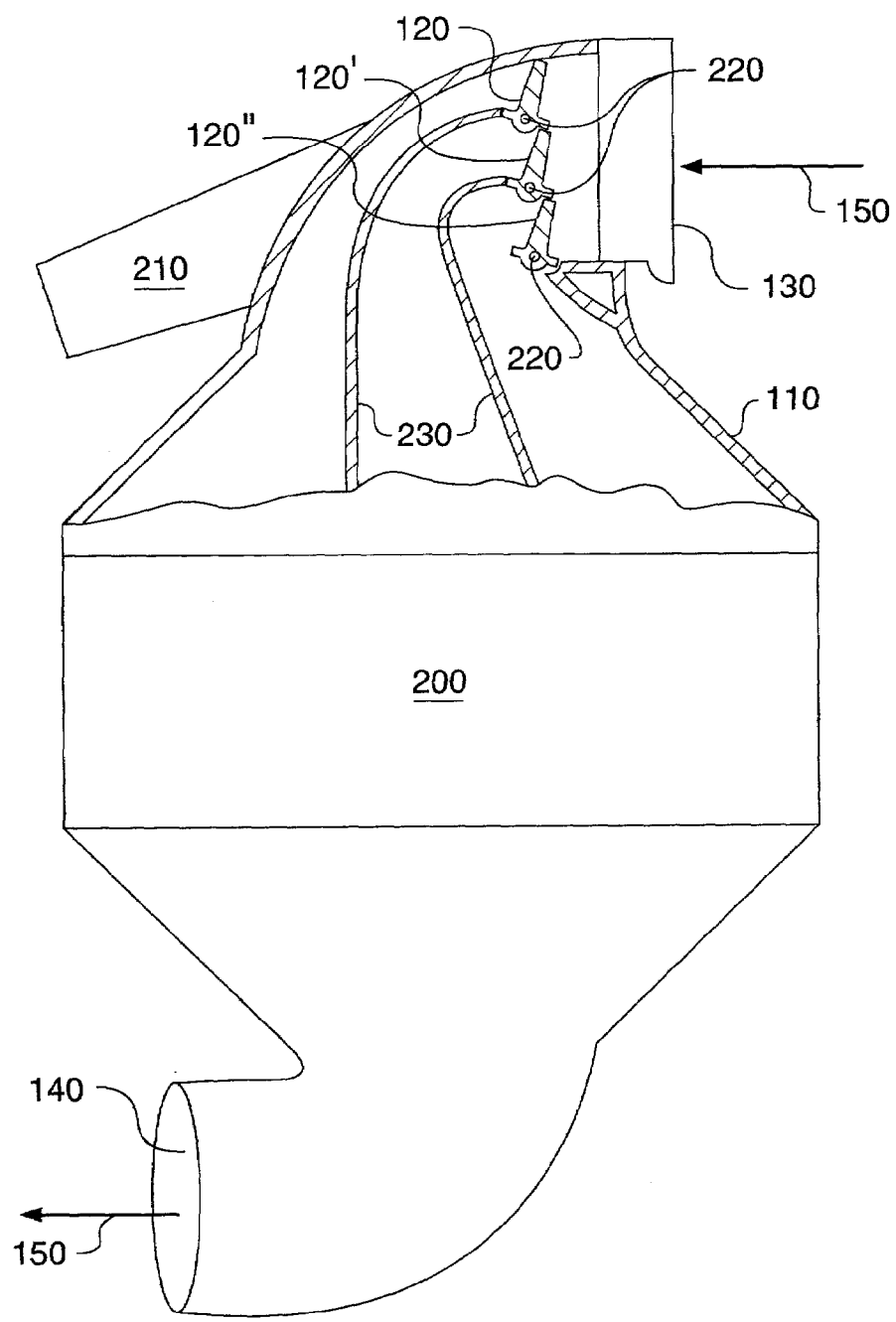
FIG. 2 is a cross-sectional view of the embodiment in FIG. 1 taken along line 2—2.

Referring to FIG. 2, the housing 110 is adapted to receive the substrate 200. The substrate 200 is at least partially disposed between at least one of the at least one inlet port 130 and at least one of the at least one outlet port 140. It should be appreciated that substrate 200 may be formed from any of a number of known materials such as cordierite ceramic materials, metal foil materials and the like or even one or more catalysts and may be of any number of known types such as a flow-through honeycomb-type and the like. Advantageously, substrate 200 is coated with any of a number of known catalysts or catalytic materials such as precious metals (e.g. palladium, platinum and the like) or an alloy at least containing some of the precious metals. Although it may be advantageous to dispose substrate 200 completely between all of the at least one inlet port 130 and the at least one outlet port 140, it should be appreciated that in some embodiments it may be advantageous to only partially dispose substrate 200 between at least one of the at least one inlet port 130 and/or at least one of the at least one outlet port 140, thereby permitting some portion of the gases 150 flowing through housing 110 to bypass substrate 200 as the gases 150 flow in at least one of the at least one inlet port 130 through the housing 110 and out through at least one of the at least one outlet port 140.

Figure 3:
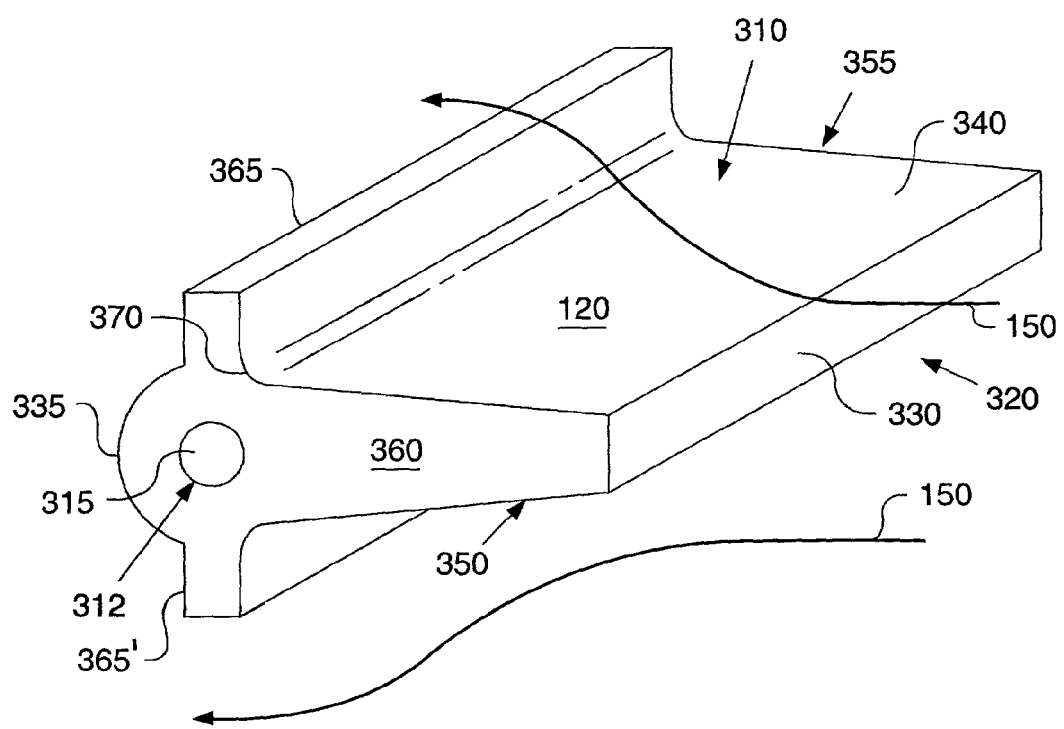
FIG. 3 is a perspective view of a deflector of the embodiment in FIG. 1.

Referring now to FIG. 3, at least one deflector 120 has at least one surface 310. The at least one deflector 120 is preferably movably connected to the housing 110 at a location generally between at least one of the at least one inlet port 130 and the substrate 200 such that the gases 150 flow across the at least one surface 310 as the gases 150 flow through at least one of the at least one inlet port 130, into the housing 110 and out of the housing 110 through at least one of the at least one outlet port 140. The at least one deflector 120 may be movably connected to the housing 110 through a connector assembly 312. Connector assembly 312 may be any number of readily available and known connecting devices, attachment devices, joints, fasteners, pivots, bearings, sockets, multi-axis supports 420 (FIG. 4), ball joints 430 (FIG. 4) and the like which are commonly known and utilized or is preferably a pin joint 315 including connecting pins 220 (FIG. 2).

The at least one surface 310 may be any of a number of flat or curved surfaces. Advantageously, at least one surface 310 may be formed from any number of portions included in the at least one deflector 120 and such portions may be of the general shape of any number of various geometric solids such as a polyhedron, ellipsoid, cylindroid and the like. It should be understood that the use of the word "polyhedron" herein means a solid bounded by polygons, the use of the word "ellipsoid" herein means a surface whose plane sections are all ellipses or circles and the use of the word "cylindroid" herein means a cylindrical surface or solid all of whose sections perpendicular to the elements are elliptical. However, it should be appreciated that such portions may not perfectly conform to such geometric solids and such minor or slight variations therefrom or combinations thereof, particularly smoothing between such portions, should be understood to fall within an embodiment and the invention as claimed in the appended claims.

In one or more embodiments, the at least one deflector 120 includes a polyhedron portion 320 having a leading surface 330 and a trailing surface 335 separating a top surface 340 and a bottom surface 350. Advantageously, the polyhedron portion 320 may have a left side surface 355 and a right side surface 360 and the polygon defining the leading surface 330 and the left and right side surfaces 355, 360 have at least one pair of opposite sides being parallel.

It should be understood, that use of the word "generally" herein in reference to any particular geometric shape, surface, solid and the like means varying in value, degree, amount, or extent.

Alternatively, at least one of the at least one surface 310 may be somewhat curved. For example, trailing surface 335 may be curved to accommodate clearance of the at least one deflector 120 and other structures within housing 110 as the at least one deflector 120 moves. It should be appreciated that although trailing surface 335 is shown as having an arc or partial circle defining the curve, such a curve could conform in cross-section with any number of nonlinear functions.

In an embodiment, at least one deflector 120 may include at least one protrusion 365, 365'. Primed reference numerals are used herein to denote elements having nearly the same structure as elements denoted with unprimed reference numerals. The at least one protrusion 365, 365' may be at least one of extending from, attached to and formed integral with at least one of the top surface 340 and the bottom surface 350. Advantageously, the at least one protrusion 365 is an ear. As used herein, an ear means a solid shape which may be of any number of geometric shapes or combinations thereof having flat or curved surfaces including such solids as a polyhedron, ellipsoid, torroid, cylindroid and the like, but advantageously is a parallelepiped (FIG. 3). It should be understood that the use of the word "torroid" herein means a surface generated by a closed curve rotating about, but not intersecting or containing, an axis in its own plane and the use of the word "parallelepiped" herein means a solid having six faces, each a parallelogram. It should be noted that in certain regions proximate to the junction of the at least one protrusion 365, 365' and at least one surface 310, or as shown in FIG. 3 polyhedron portion 320, there may be smooth transitions 370 which may provide enhanced aerodynamic properties.

Figure 4:
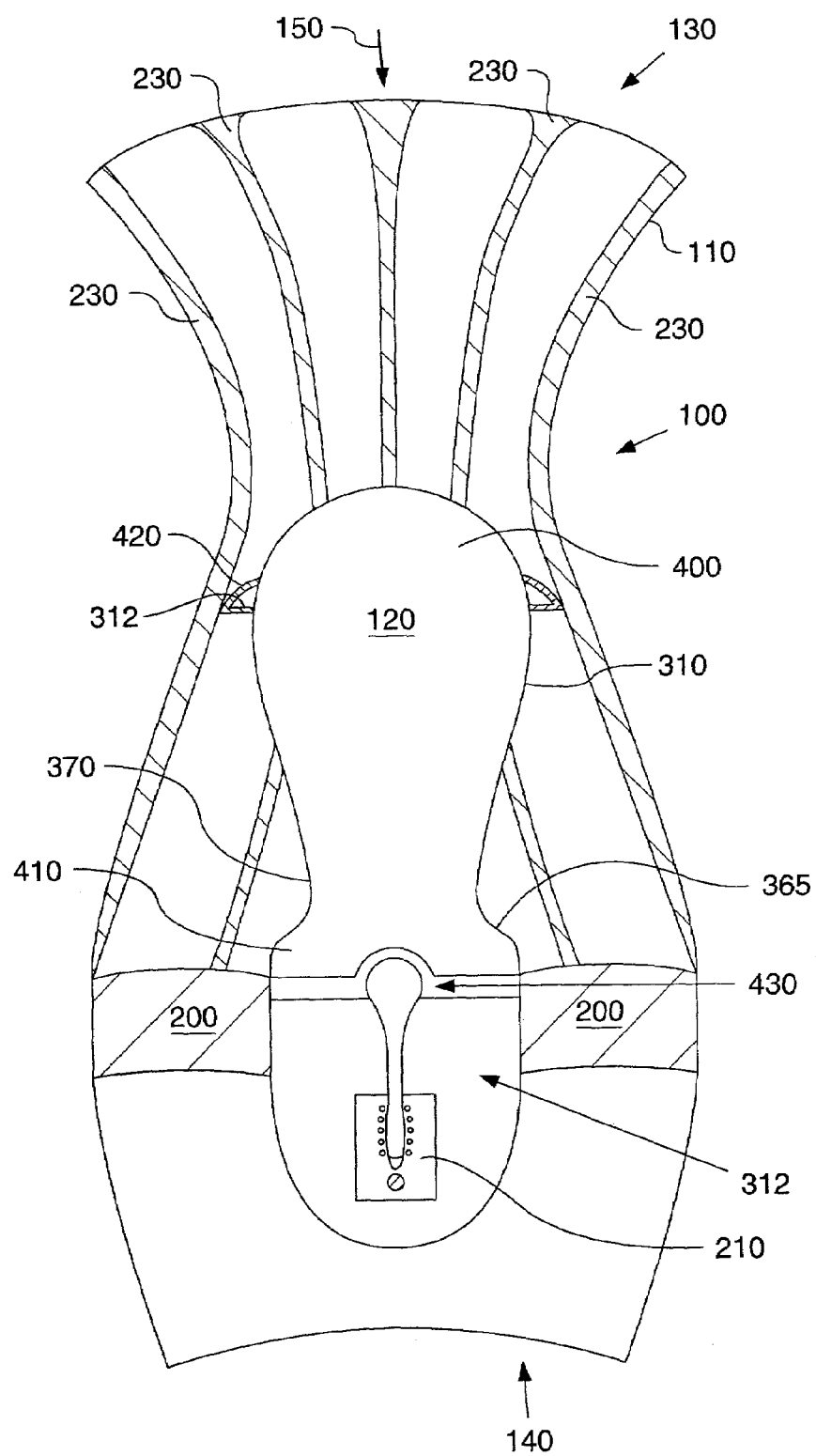
FIG. 4 is a cross-sectional view of an embodiment.

Alternatively, the at least one deflector 120 may include a generally ellipsoid portion 400 having at least one surface 310 as shown in FIG. 4. In such an embodiment, the at least one protrusion 365 may include a generally torroid portion 410 being at least one of extending from, attached to and formed integral with ellipsoid portion 400. Deflector 120 may be moveably connected to the housing 110 through the connector assembly 312 which may preferably include multi-axis support 420, ball joint 430 and the like or a combination thereof.

It should be understood that although the present invention has been described with reference to various embodiments particularly described above, other shapes and configurations of the at least one deflector 120 may be used to substantially equalize the mass flow rate of gases 150 across the at least one surface 310 as the gases 150 flow through at least one of the at least one inlet port 130 into the housing 110 and out of the housing 110 through at least one of the at least one outlet port 140 without deviating from the scope of an embodiment of the present invention and should be understood to fall within the present invention as claimed in the appended claims.

Referring back to FIG. 2, it may be advantageous for the at least one deflector 120, 120', 120" to be configured to selectively impede the flow of gases 150 through the housing 110. Such a configuration may be achieved by utilizing any number of known actuation mechanisms such as mechanical devices; electrical devices, including solenoids, motors, piezo-electric devices; pneumatic or hydraulic devices; and the like but preferably a hydraulic actuator 210 to force the at least one deflector 120, 120', 120" to be oriented in a particular direction.

Preferably, hydraulic actuator 210 is operatively coupled to at least one deflector 120, 120', 120" such that as hydraulic actuator 210 is operated the at least one deflector 120, 120', 120" is moved to a particular position (e.g. rotated about connecting pins 220 as shown in FIG. 2), thereby impeding the flow of gases 150 through the housing 110. Advantageously, connecting pins 220 may be connected to the hydraulic actuator 210 to cause such actuation. From this example, it may be appreciated that one or more of the at least one deflector 120 may have a fewer number of ears (e.g., deflector 120") or different ears, thereby structurally permitting orientation of the at least one deflector 120 in a direction that may selectively impede the flow of gases 150 through the housing 110.

In an embodiment, an actuation mechanism may be operatively coupled to at least one deflector 120 such that as the actuation mechanism is operated, at least one of the at least one deflector 120 is moved into contact with the housing 110, thereby impeding the flow of gases 150 through the housing 110. Referring to FIG. 4, it may be advantageous for connector assembly 312 and more particularly multi-axis support 420 and/or ball joint 430 to be connected to an actuation mechanism such as hydraulic actuator 210 which, upon actuation, forces the at least one of the at least one deflector 120 toward housing 110 such that the at least one surface 310 comes in contact with housing 110.

In one or more embodiments it may be advantageous for housing 110 to include at least one vane 230 to direct the gases 150 from the at least one deflector 120, 120', 120" to the substrate 200. The at least one vane 230 may be of any variety of a number of structures designed for or that in fact result in directing gases 150 from the at least deflector 120 to the substrate 200.

While aspects of the present invention have been particularly shown and described with reference to the embodiments above, it should be understood by those skilled in the art that various additional embodiments may be contemplated without departing from the spirit and scope of the invention. For example, the at least one deflector 120 may include a portion generally of the shape of a pyramid, prism or other solid which in cross section the boundaries of which are defined by a triangle or an at least partially curved shape having, for example, a parabolic or hyperbolic curve or the like. However, a device or method incorporating such an embodiment should be understood to fall within the scope of the present invention as determined based upon the claims below and in any equivalents thereof.

INDUSTRIAL APPLICABILITY

In an embodiment, housing 110 is directly mounted to an engine having an exhaust manifold and exhaust gases 150 flow directly from an exhaust manifold into housing 110 through inlet port 130. Upon entry into housing 110 through inlet 130, exhaust gases 150 flow across at least one surface 310 of at least one of the at least one deflector 120. Exhaust gases 150 eventually flow across the at least one surface 310 and at least one of the at least one protrusion 365. A flow of exhaust gases 150 across at least one of the at least one protrusion 365 creates pressure on the at least one of the at least one deflector 120 at a location corresponding to the at least one of the at least one protrusion 365, thereby causing the at least one of the at least one deflector 120 to orient about pin joint 315 toward at least one of the at least one protrusion 365.

In an embodiment where more than one protrusion 365 exists, there are multiple pressures at multiple locations upon the at least one of the at least one deflector 120 by exhaust gases 150 (e.g. where at least one of the at least one deflector 120 is symmetrical, the at least one deflector 120 becomes self-correcting). For example, for the same flow area, symmetrical deflector 120 geometry, and a constant exhaust gas 150 density, when the pressure from exhaust gases 150 flowing across the at least one of the at least one protrusion 365 is greater than the pressure created from exhaust gases 150 flowing across another of the at least one of the at least one protrusion 365, an unbalanced load will exist across the at least one of the at least one protrusion 365. This unbalanced load will be proportional to the mass flow of exhaust gases 150 and the area of the at least one protrusion 365. Under such conditions, the unbalanced load will orient the leading surface 330 of the at least one deflector 120 toward the at least one protrusion 365 having a higher pressure exerted thereon by the gases 150 until the pressure is substantially equalized.

Advantageously, at least one of the at least one deflector 120 may be spring loaded to nominally center at least one of the at least one deflector 120 and to minimize any flapping or pulsating action. The spring may be part of an external linkage or included with an actuation mechanism. Inclusion of such an actuation mechanism allows at least one of the at least one deflector 120 to be oriented such that exhaust gases 150 are impeded from flowing past at least one of the at least one deflector 120, thereby functioning as an exhaust brake.

The apparatus and method of certain embodiments, when compared with other methods and apparatus, may have the advantages of evenly distributing flow of gases 150 across a substrate 200 in order to achieve maximum performance of a catalyst, providing compact packaging, turning gases 150 quickly while maintaining an even mass flow distribution across a substrate 200, balancing the flow variances and evenly distributing gases 150 across a substrate 200, providing a self-optimizing apparatus, providing a system compatible with multiple engines across multiple engine ratings upon multiple engine operating conditions, facilitating incorporation of an exhaust brake, providing hotter gases 150 to a substrate 200 and being more economical to manufacture and use. Such advantages are particularly worthy of incorporating the design, manufacture, and operation of catalytic converter assemblies 100. In addition, the present invention may provide other advantages that have not been discovered yet.

Other aspects, objects, and advantages of the present invention can be obtained from a study of the drawings, the disclosure, and the appended claims.

What is claimed is:

1. A catalytic converter assembly for receiving a flow of gases, comprising:
   a substrate;
   a housing having at least one inlet hand at least one outlet;
   the at least one inlet and the at least one outlet being in fluid communication such that gases flow through the at least one inlet into the housing and out of the housing through the at least one outlet;
   the housing being adapted to receive the substrate;
   the substrate at least partially disposed between at least one of the at least one inlet and at least one of the at least one outlet;
   at least one deflector;
   the at least one deflector having at least one surface;
   the at least one deflector being moveably connected to the housing at a location generally between at least one of the at least one inlet and the substrate and mounted to be movable by the flow of gases, and
   the at least one deflector being configured to substantially equalize the mass flow rate of the gases across the at least one surface as the gases flow through the at least one inlet into the housing and out of the housing through the at least one outlet.

2. The assembly of claim 1, wherein the at least one deflector includes a generally polyhedron portion having a leading surface and a trailing surface separating a top surface and a bottom surface.

3. The assembly of claim 2, wherein the polyhedron has left and right side surfaces and polygons defining the leading and left and right side surfaces, the polygons having at least one pair of opposite sides being parallel.

4. The assembly of claim 3, wherein at least one surface is at least somewhat curved.

5. The assembly of claim 4, wherein the deflector includes at least one protrusion at least one of extending from, attached to and formed integral with at least one of the top surface and bottom surface.

6. The assembly of claim 5, wherein the protrusion is an ear.

7. The assembly of claim 5, wherein the at least one deflector is movably connected to the housing by a pin joint.

8. The assembly of claim 5, wherein the at least one deflector being configured to selectively impede the flow of gases through the housing.

9. The assembly of claim 5, wherein the housing includes at least one vane to direct the gases from the deflector to the substrate.

10. A catalytic converter assembly for receiving a flow of gases, comprising:
    a substrate;
    a housing having at least one inlet hand at least one outlet;
    the at least one inlet and the at least one outlet being in fluid communication such that gases flow through the at least one inlet into the housing and out of the housing through the at least one outlet;
    the housing being adapted to receive the substrate;
    the substrate at least partially disposed between at least one of the at least one inlet and at least one of the at least one outlet;
    at least one deflector mounted to be movable by the flow of gases;
    the at least one deflector having at least one surface;
    at least one protrusion at least one of extending from, attached to and formed integral with at least one of the at least one surface;
    the at least one deflector being moveably connected to the housing at a location generally between the substrate and at least one of the at least one inlet such that the gases flow across the at least one surface as the gases flow through the at least one inlet into the housing and out of the housing through the at least one outlet.

11. The catalytic converter assembly of claim 10, wherein the at least one deflector includes a generally ellipsoid portion.

12. The catalytic converter assembly of claim 11, wherein the at least one protrusion includes a generally torroid portion.

13. The assembly of claim 10, wherein the at least one deflector includes a generally polyhedron portion having a leading surface and a trailing surface separating a top surface and a bottom surface.

14. The assembly of claim 13, wherein the polyhedron has left and right side surfaces and polygons defining the leading and left and right side surfaces, the polygons having at least one pair of opposite sides being parallel.

15. The assembly of claim 14, wherein at least one surface is at least somewhat curved.

16. The assembly of claim 15, wherein the protrusion is an ear.

17. The assembly of claim 15, wherein the at least one deflector is movably connected to the housing by a pin joint.

18. The assembly of claim 15, wherein the at least one deflector being configured to selectively impede the flow of gases through the housing.

19. The assembly of claim 15, wherein the housing includes at least one vane to direct the gases from the deflector to the substrate.

\* \* \* \* \*